US012677066B1

(12) United States Patent
Chen

(10) Patent No.: US 12,677,066 B1
(45) Date of Patent: Jul. 7, 2026

(54) IMAGE PROCESSING SYSTEM AND METHOD FOR CONTROLLING AN IMAGE SENSOR TO SWITCH BETWEEN CROP MODE AND BINNING MODE

(71) Applicant: HIMAX TECHNOLOGIES LIMITED, Tainan City (TW)

(72) Inventor: Keng-Chih Chen, Tainan City (TW)

(73) Assignee: HIMAX TECHNOLOGIES LIMITED, Tainan City (TW)

( * ) Notice: Subject to any disclaimer, the term of this patent is extended or adjusted under 35 U.S.C. 154(b) by 41 days.

(21) Appl. No.: 19/012,806

(22) Filed: Jan. 7, 2025

(51) Int. Cl.
| | |
|---|---|
| *H04N 23/667* | (2023.01) |
| *G06V 10/25* | (2022.01) |
| *G06V 10/26* | (2022.01) |
| *G06V 10/70* | (2022.01) |
| *H04N 23/61* | (2023.01) |
| *H04N 23/617* | (2023.01) |
| *H04N 23/63* | (2023.01) |
| *H04N 23/69* | (2023.01) |
| *H04N 25/42* | (2023.01) |
| *H04N 25/443* | (2023.01) |
| *H04N 25/46* | (2023.01) |

(52) U.S. Cl.
CPC ........... *H04N 23/667* (2023.01); *G06V 10/25* (2022.01); *G06V 10/26* (2022.01); *G06V 10/70* (2022.01); *H04N 23/61* (2023.01); *H04N 23/617* (2023.01); *H04N 23/635* (2023.01); *H04N 23/69* (2023.01); *H04N 25/42* (2023.01); *H04N 25/443* (2023.01); *H04N 25/46* (2023.01)

(58) Field of Classification Search
CPC ...... H04N 23/667; H04N 25/42; H04N 23/61; H04N 23/611; H04N 23/617; H04N 23/635; H04N 23/69; H04N 25/443; H04N 25/46; G06V 10/25; G06V 10/26; G06V 10/70
See application file for complete search history.

(56) References Cited

U.S. PATENT DOCUMENTS

| | | | | |
|---|---|---|---|---|
| 11,218,641 | B2 * | 1/2022 | Liu | H04N 23/667 |
| 2018/0367752 | A1 * | 12/2018 | Donsbach | H04N 5/77 |
| 2021/0075969 | A1 * | 3/2021 | Liu | H04N 23/667 |
| 2024/0284045 | A1 * | 8/2024 | Zhang | H04N 25/42 |

* cited by examiner

*Primary Examiner* — Twyler L Haskins
*Assistant Examiner* — Akshay Trehan
(74) *Attorney, Agent, or Firm* — CKC & Partners Co., LLC

(57) ABSTRACT

An image processing system includes an image sensor, an object detector, an artificial intelligence (AI) inference engine and a mode controller. The image sensor is configured to capture an image. The object detector is configured to determine whether an object exists in the image, and utilize a bounding box to frame the object to obtain a region of interest (ROI) image after determining that the object exists in the image. The artificial intelligence (AI) inference engine is configured to recognize the ROI image to obtain a recognition result. The mode controller is configured to compare an ROI size of the ROI image with a lower limit of a ROI size threshold, and switches the image processing system to a crop mode or a binning mode.

20 Claims, 5 Drawing Sheets

100

400

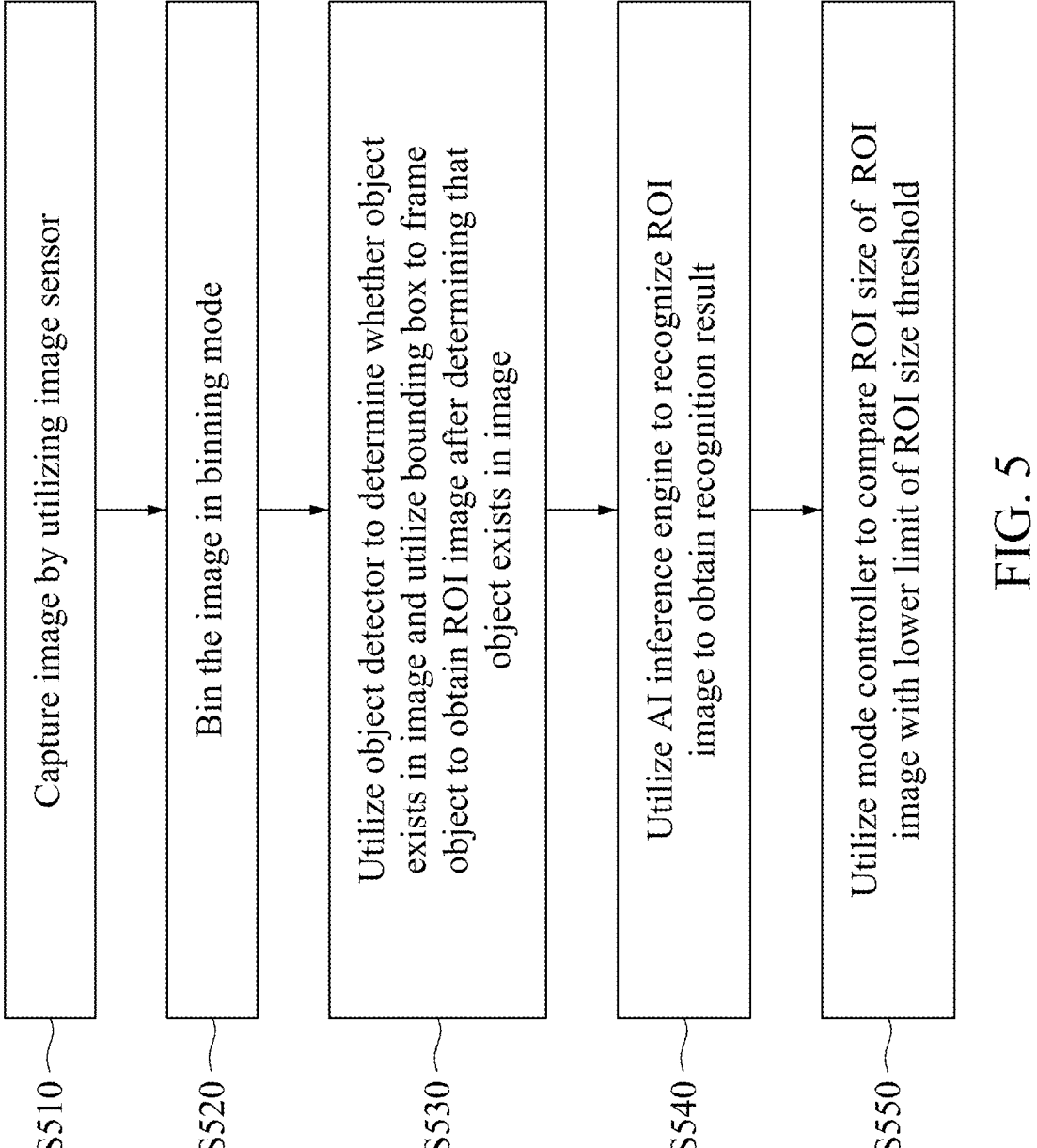

500

S510 — Capture image by utilizing image sensor

S520 — Bin the image in binning mode

S530 — Utilize object detector to determine whether object exists in image and utilize bounding box to frame object to obtain ROI image after determining that object exists in image S540 — Utilize AI inference engine to recognize ROI image to obtain recognition result S550 — Utilize mode controller to compare ROI size of ROI image with lower limit of ROI size threshold

FIG. 5

IMAGE PROCESSING SYSTEM AND METHOD FOR CONTROLLING AN IMAGE SENSOR TO SWITCH BETWEEN CROP MODE AND BINNING MODE

BACKGROUND

Technical Field

The present disclosure relates to a processing system and a processing method, and more particular to an image processing system and an image processing method.

Description of Related Art

Due to limitations in the image size that the hardware can process, applications of distance detection based on image recognition is limited by the field of view (FOV) of lens. When the field of view of the lens is enlarged, although close objects can be recognized, distant objects are difficult to be recognized; on the contrary, when the field of view of the lens is narrowed, although distant objects can be recognized, close objects may be beyond the field of view. Therefore, how to increase the distance at which objects can be recognized by artificial intelligence (AI) inference engines at low cost (avoiding additional sensing components, such as optical zoom components) has become an important issue.

SUMMARY

The object of the present disclosure is to increase the distance at which objects can be recognized by AI inference engines at low cost, that is, without additional sensing components such as optical zoom components.

One aspect of the present disclosure relates to an image processing system includes an image sensor, an object detector, an AI inference engine and a mode controller. The image sensor is configured to capture an image. The object detector is configured to determine whether an object exists in the image, and utilize a bounding box to frame the object to obtain a region of interest (ROI) image after determining that the object exists in the image. The AI inference engine is configured to recognize the ROI image to obtain a recognition result. The mode controller is coupled to the image sensor, the object detector and the AI inference engine, and the mode controller is configured to compare an ROI size of the ROI image with a lower limit of a ROI size threshold, wherein the mode controller switches the image processing system to a crop mode and controls the image sensor to capture a crop image according to an ROI location of the ROI image in response to the ROI size being less than the lower limit of the ROI size threshold, and wherein the mode controller switches the image processing system to a binning mode and controls the image sensor to perform a binning on the image in response to the ROI size being greater than or equal to the lower limit of the ROI size threshold.

In accordance with one or more embodiments of the present disclosure, the mode controller is further configured to confirm the recognition result while comparing the ROI size with the lower limit of the ROI size threshold, and the mode controller switches the image processing system to the crop mode and controls the image sensor to capture the crop image according to an ROI location in response to the ROI size being less than the lower limit of the ROI size threshold and the recognition result indicates that the AI inference engine fails to recognize the ROI image.

In accordance with one or more embodiments of the present disclosure, the mode controller is further configured to confirm the recognition result while comparing the ROI size with the lower limit of the ROI size threshold, and the mode controller switches the image processing system to the binning mode and controls the image sensor to perform the binning on the image in response to the ROI size being greater than or equal to the lower limit of the ROI size threshold and the recognition result is successful.

In accordance with one or more embodiments of the present disclosure, the binning mode is a default mode of the image processing system.

In accordance with one or more embodiments of the present disclosure, the ROI location is determined by a location of the bounding box.

In accordance with one or more embodiments of the present disclosure, the ROI location is composed of two or more ROI coordinates.

In accordance with one or more embodiments of the present disclosure, the mode controller controls the image sensor to capture the crop image according to the ROI coordinates.

In accordance with one or more embodiments of the present disclosure, a size of the crop image is predetermined and smaller than a size of the image.

In accordance with one or more embodiments of the present disclosure, the mode controller controls the image processing system to stay in the crop mode and controls the image sensor to capture the crop image according to the ROI location in response to the ROI size being greater than or equal to the lower limit of the ROI size threshold.

In accordance with one or more embodiments of the present disclosure, the mode controller switches the image processing system to the binning mode and controls the image sensor to perform the binning on the image in response to the ROI size being greater than an upper limit of the ROI size threshold.

Another aspect of the present disclosure relates to an image processing method suitable for an image processing system including an image sensor, an object detector, an AI inference engine and a mode controller, the image processing method includes capturing an image by utilizing the image sensor; binning the image in a binning mode; utilizing the object detector to determine whether an object exists in the image and utilizing a bounding box to frame the object to obtain an ROI image after determining that the object exists in the image; utilizing the AI inference engine to recognize the ROI image to obtain a recognition result; and utilizing the mode controller to compare an ROI size of the ROI image with an lower limit of an ROI size threshold, wherein the mode controller switches the image processing system to a crop mode and controls the image sensor to capture a crop image according to an ROI location of the ROI image in response to the ROI size being less than the lower limit of the ROI size threshold, and wherein the mode controller switches the image processing system to the binning mode and controls the image sensor to perform a binning on the image in response to the ROI size being greater than or equal to the lower limit of the ROI size threshold.

BRIEF DESCRIPTION OF THE DRAWINGS

This disclosure can be more fully understood by reading the following detailed description of the embodiments, with reference made to the accompanying drawings as follows:

3 4

Figure 1:
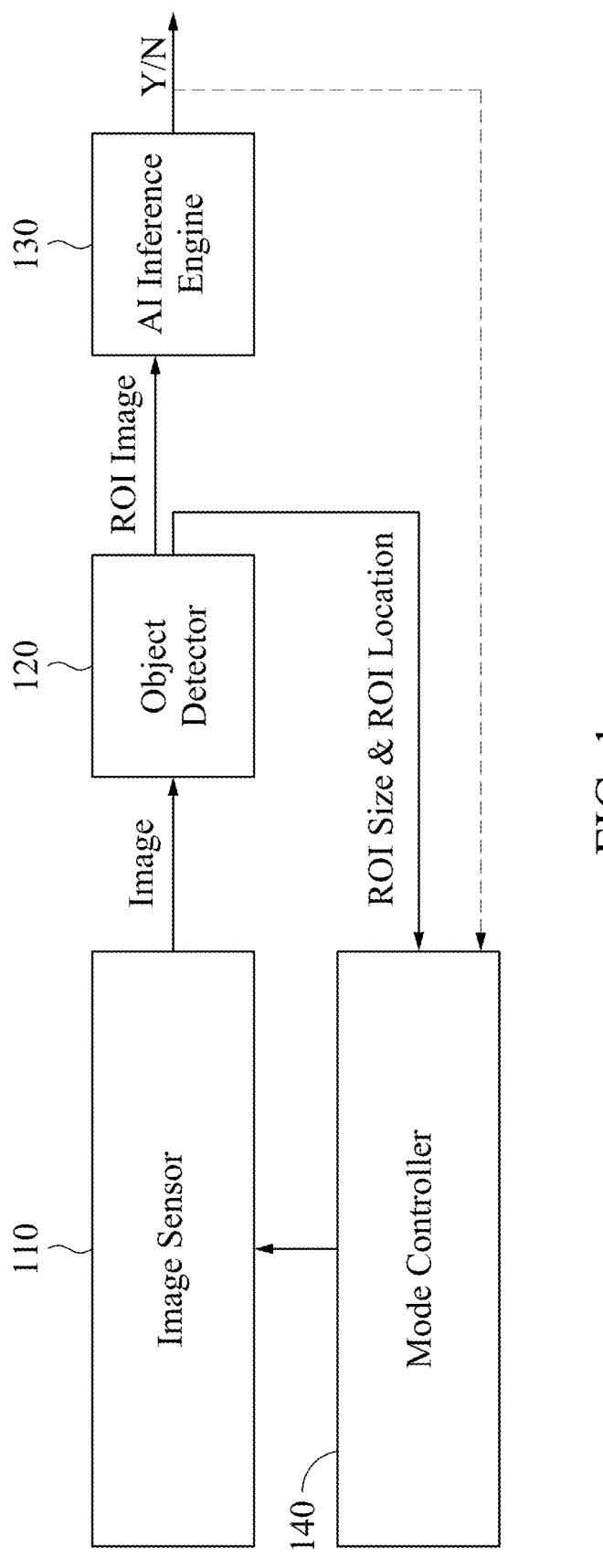

FIG. 1 is a functional block diagram of an image processing system in accordance with some embodiments of the present disclosure.

Figure 2:
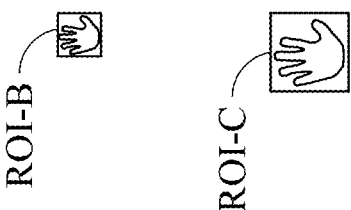
Figure 2:
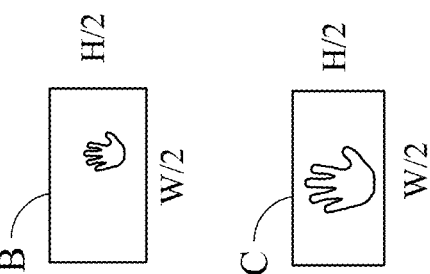
Figure 2:
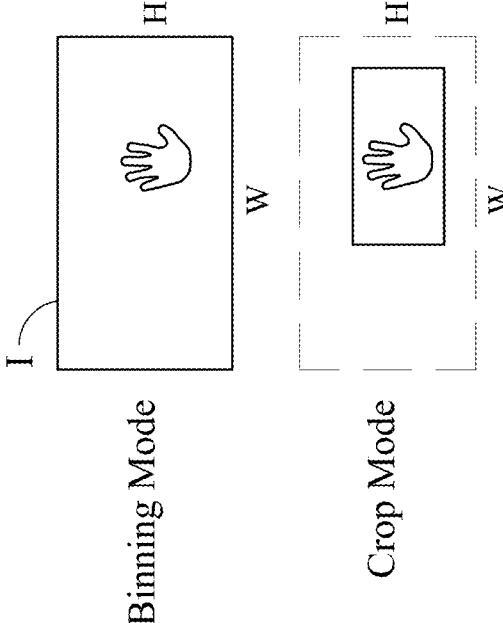

FIG. 2 illustrates an operation of the mode controller in a binning mode and a crop mode in accordance with some embodiments of the present disclosure.

Figure 3:
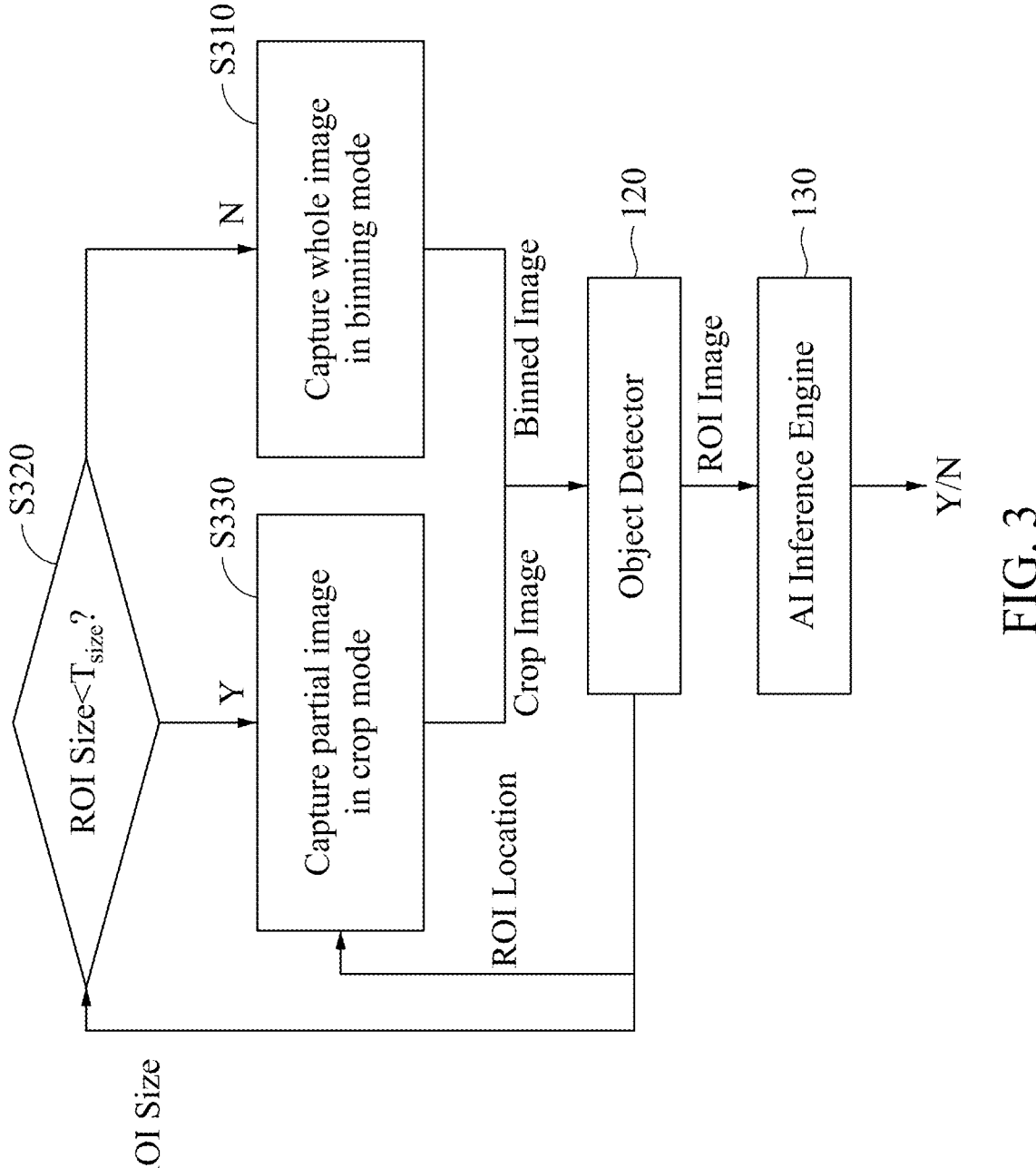

FIG. 3 is a flowchart of an operation process of the image processing system in accordance with some embodiments of the present disclosure.

Figure 4:
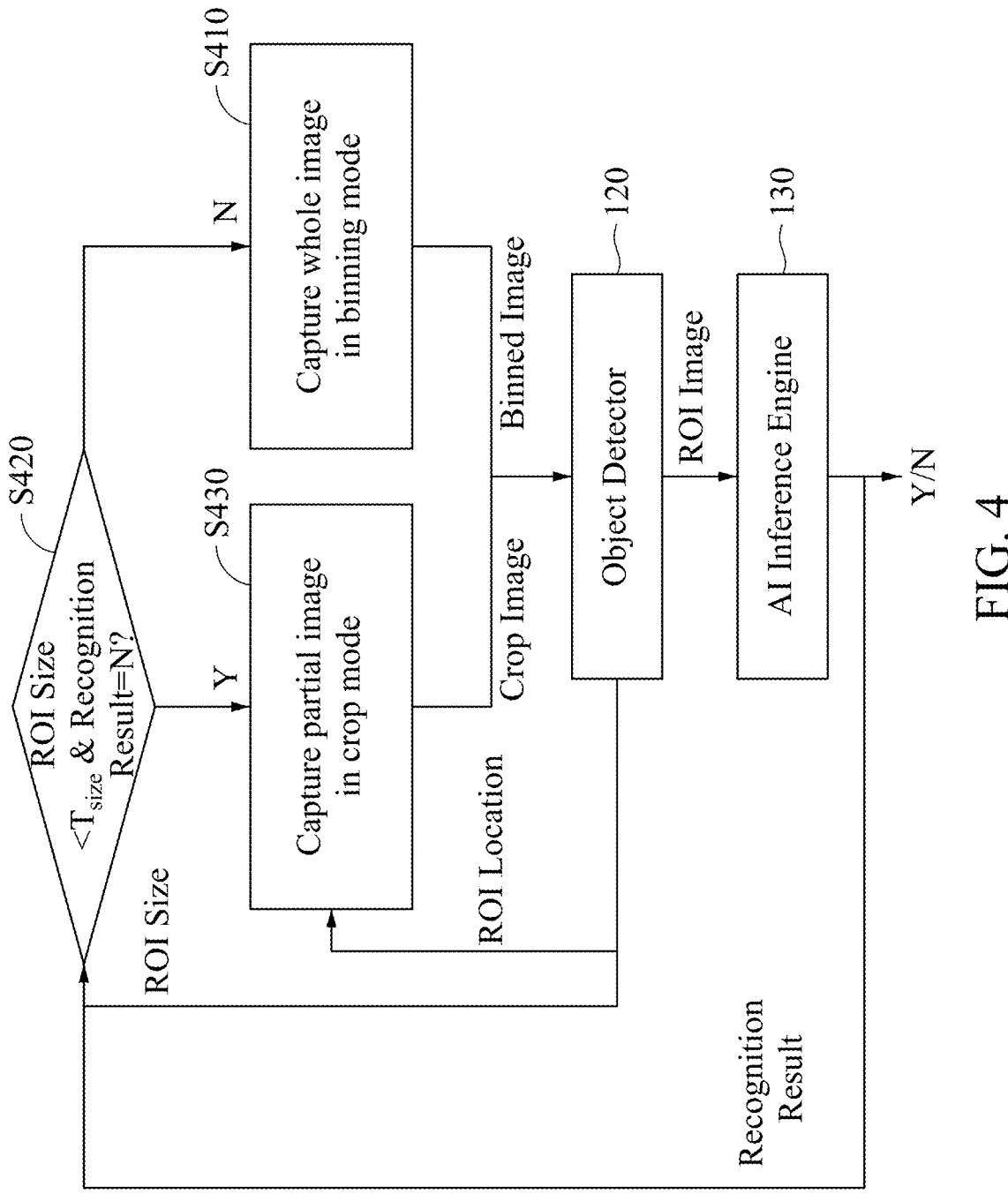

FIG. 4 is a flowchart of another operation process of the image processing system in accordance with some embodiments of the present disclosure.

FIG. 5 is a flowchart of an image processing method in accordance with some embodiments of the present disclosure.

DETAILED DESCRIPTION

Reference will now be made in detail to the present embodiments of this disclosure, examples of which are illustrated in the accompanying drawings. Wherever possible, the same reference numbers are utilized in the drawings and the description to refer to the same or like parts. The verb "couple" and its conjugated forms means to complete any type of required junction, including electrical, mechanical or fluid, to form a singular object from two or more previously non-joined objects.

FIG. 1 is a functional block diagram of an image processing system 100 in accordance with some embodiments of the present disclosure. The image processing system 100 includes an image sensor 110, an object detector 120, an artificial intelligence (AI) inference engine 130, and a mode controller 140. The image sensor 110 is configured to capture an image. The image sensor 110 may be a visible light sensor, a complementary metal-oxide-semiconductor (CMOS) image sensor, a charge-coupled device (CCD) image sensor, other light sensing components, other light sensing devices, or a combination of the above components, but is not limited to this. The object detector 120 is configured to determine whether an object exists in the image, and utilize a bounding box to frame the object to obtain a region of interest (ROI) image after determining that the object exists in the image. The artificial intelligence (AI) inference engine 130 is configured to recognize the ROI image to obtain a recognition result. The mode controller 140 is coupled to the image sensor 110, the object detector 120 and the AI inference engine 130, and the mode controller 140 is configured to compare an ROI size of the ROI image with a lower limit of a ROI size threshold, in which the mode controller 140 switches the image processing system 100 to a crop mode and controls the image sensor 110 to capture a crop image according to an ROI location of the ROI image in response to the ROI size being less than the lower limit of the ROI size threshold, and wherein the mode controller 140 switches the image processing system 100 to a binning mode and controls the image sensor 110 to perform a binning on the image in response to the ROI size being greater than or equal to the lower limit of the ROI size threshold. Generally, the mode controller 140 has a processor which may be a central processing unit (CPU), a graphics processing unit (GPU), a microcontroller unit (MCU), a microprocessor, a system-on-chip (SoC), a digital signal processor (DSP), an application-specific integrated circuit (ASIC), a programmable logic controller (PLC), or a combination of the above components, but not limited to this.

The operation of the image processing system 100 may be divided into two modes: a binning mode and a crop mode. Generally, an image is captured by the image sensor 110 and then sent to the object detector 120. However, it should be noted that a default mode of the image processing system 100 is the binning mode. Therefore, in one embodiment of the present disclosure, after an image captured by the image sensor 110 in the binning mode, the image is binned as a binned image and then sent to the object detector 120.

After receiving the image from the image sensor 110, the object detector 120 then determines whether an object exists in the image, and utilizes a bounding box to frame the object to obtain a region of interest (ROI) image after determining that the object exists in the image. The obtained ROI image is then sent to the AI inference engine 130 to be recognized. In addition, the ROI size and the ROI location of the obtained ROI image are then sent to the mode controller 140.

After receiving the ROI size and the ROI location from the object detector 120, the mode controller 140 then compares the ROI size of the ROI image with a lower limit of a ROI size threshold. It should be noted that the ROI size is actually the resolution of the ROI image.

In one embodiment of the present disclosure, the mode controller 140 switches the image processing system 100 to the crop mode and controls the image sensor 110 to capture a crop image according to the ROI location of the ROI image in response to the ROI size being less than the lower limit of the ROI size threshold. In detail, the situation of the ROI size being less than the lower limit of the ROI size threshold means that the objects in the image are too small and may be difficult to recognize. Therefore, the mode controller 140 needs to control the image sensor 110 to capture the crop image to improve the recognition rate of the objects.

It should be noted that the ROI location is determined by a location of the bounding box. In some embodiments, the ROI location is composed of two or more ROI coordinates. In these embodiments, after switching the image processing system 100 to the crop mode, the mode controller 140 controls the image sensor 110 to capture the crop image according to the ROI coordinates.

On the contrary, the mode controller 140 switches the image processing system 100 to the binning mode and controls the image sensor to perform a binning on the image in response to the ROI size being greater than or equal to the lower limit of the ROI size threshold. In detail, the situation of the ROI size being greater than or equal to the lower limit of the ROI size threshold means that the objects in the image are recognizable. Therefore, the mode controller 140 may perform the binning on the image, that is, downsize the image directly, because the objects in the binned image are recognizable.

In some embodiments, the mode controller 140 controls the image processing system 100 to stay in the crop mode and controls the image sensor 110 to capture the crop image according to the ROI location in response to the ROI size being greater than or equal to the lower limit of the ROI size threshold.

In some embodiments, the mode controller 140 switches the image processing system 100 to the binning mode and controls the image sensor 110 to perform the binning on the image in response to the ROI size being greater than an upper limit of the ROI size threshold.

FIG. 2 illustrates an operation of the mode controller 140 in the binning mode and the crop mode in accordance with some embodiments of the present disclosure. Referring to FIG. 2, It may be assumed that the image length of the whole image I is W, the image width of the whole image I is H, the image length of the binned image B is $$\frac{W}{2},$$

the image width of the binned image B is $$\frac{H}{2},$$

the image length of the crop image C is $$\frac{W}{2},$$

the image width of the crop image C is $$\frac{H}{2}.$$

By comparing the binned image B (binned by the mode controller 140 in the binning mode) and the crop image C (cropped by the mode controller 140 in the crop mode) in FIG. 2, it may be obviously seen that recognizing objects in the crop image C is easier than recognizing objects in the binned image B with the same image size $$\left(\frac{W}{2} \times \frac{H}{2}\right)$$

of the binned image B and the crop image C. In other words, the ROI image ROI-C in the crop image C is easier to be recognized than the ROI image ROI-B in the binned image B. It should be noted that the size of the crop image C $$\left(e.g. \ \frac{W}{2} \times \frac{H}{2}\right)$$

is predetermined and smaller than a size of the whole image I (e.g. W×H).

FIG. 3 is a flowchart of an operation process 300 of the image processing system 100 in accordance with some embodiments of the present disclosure. The operation process 300 shows the embodiment of the image processing system 100 switched to the crop mode or the binning mode by the mode controller 140 according to the ROI size received from the object detector 120. In Step S310, a whole image is captured in the binning mode of the image processing system 100 (due to the binning mode is the default mode), the whole image is binned as a binned image and then sent to the object detector 120. After receiving the binned image from the image sensor 110, the object detector 120 then determines whether an object exists in the binned image, and utilizes a bounding box to frame the object to obtain a region of interest (ROI) image after determining that the object exists in the binned image. The obtained ROI image is then sent to the AI inference engine 130 to be recognized. In addition, the ROI size and the ROI location of the obtained ROI image are then sent to the mode controller 140. In Step S320, after receiving the ROI size from the object detector 120, the mode controller 140 then compares the ROI size of the ROI image with a lower limit of a ROI size threshold (represented as $T_{size}$ in FIG. 3). In one embodiment of the present disclosure, the mode controller 140 switches the image processing system 100 to the crop mode and controls the image sensor 110 to capture a crop image according to the ROI location of the ROI image in response to the ROI size being less than $T_{size}$ (represented as "Y" path in FIG. 3) in Step S330. On the contrary, the mode controller 140 switches the image processing system 100 to the binning mode and controls the image sensor to perform the binning on the image in response to the ROI size being greater than or equal to $T_{size}$ (represented as "N" path in FIG. 3).

In addition to switching the image processing system 100 to the crop mode or the binning mode according to the ROI size, the mode controller 140 may also switch the image processing system 100 to the crop mode or the binning mode according to the recognition result obtained from the AI inference engine 130.

In another embodiment of the present disclosure, after receiving the ROI size and the ROI location from the object detector 120 and receiving the recognition result of the object from the AI inference engine 130, the mode controller 140 switches the image processing system 100 to the crop mode and controls the image sensor 110 to capture the crop image according to the ROI location of the ROI image in response to the ROI size being less than the lower limit of the ROI size threshold and the recognition result being failed. That is, the mode controller 140 confirms the recognition result of the object while comparing the ROI size with the lower limit of the ROI size threshold. In detail, both the situation of the ROI size being less than the lower limit of the ROI size threshold and the situation of the recognition result being failed mean that the objects in the image are too small and may be difficult to recognize. Therefore, the mode controller 140 needs to control the image sensor 110 to capture the crop image to improve the recognition rate of the objects.

On the contrary, the mode controller 140 switches the image processing system 100 to the binning mode and controls the image sensor to perform the binning on the image in response to the ROI size being greater than or equal to the lower limit of the ROI size threshold and the recognition result being successful. That is, the mode controller 140 confirms the recognition result of the object while comparing the ROI size with the lower limit of the ROI size threshold. In detail, both the situation of the ROI size being greater than or equal to the lower limit of the ROI size threshold and the situation of the recognition result being successful mean that the objects in the image are recognizable. Therefore, the mode controller 140 may perform the binning on the image, that is, downsize the image directly, because the objects in the binned image are recognizable.

It should be noted that as long as the recognition result is successful, even if the ROI size is less than the lower limit of the ROI size threshold, the mode controller 140 stays the image processing system 100 in the binning mode (that is, the mode controller 140 will not switch the image processing system 100 to the crop mode), and performs the binning on the image.

FIG. 4 is a flowchart of another operation process 400 of the image processing system 100 in accordance with some embodiments of the present disclosure. The operation process 400 shows the embodiment of the image processing system 100 switched to the crop mode or the binning mode by the mode controller 140 according to the ROI size received from the object detector 120 and recognition result received from the AI inference engine 130. In Step S410, a whole image is captured in the binning mode of the image processing system 100 (due to the binning mode is the default mode), the whole image is binned as a binned image and then sent to the object detector 120. After receiving the binned image from the image sensor 110, the object detector 120 then determines whether an object exists in the binned image, and utilizes a bounding box to frame the object to obtain a region of interest (ROI) image after determining that the object exists in the binned image. The obtained ROI image is then sent to the AI inference engine 130 to be recognized, and the recognition result is then sent from the AI inference engine 130 to the mode controller 140. In addition, the ROI size and the ROI location of the obtained ROI image are then also sent from the object detector 120 to the mode controller 140. In Step S420, after receiving the ROI size from the object detector 120 and receiving the recognition result from the AI inference engine 130, the mode controller 140 then compares the ROI size of the ROI image with a lower limit of a ROI size threshold (represented as $T_{size}$ in FIG. 4), and determines the recognition result is successful or failed at the same time. In one embodiment of the present disclosure, the mode controller 140 switches the image processing system 100 to the crop mode and controls the image sensor 110 to capture a crop image according to the ROI location of the ROI image in response to the ROI size being less than $T_{size}$ and the recognition result is failed (represented as "Y" path in FIG. 4) in Step S430. On the contrary, the mode controller 140 switches the image processing system 100 to the binning mode and controls the image sensor to perform the binning on the image in response to the ROI size being greater than or equal to $T_{size}$ and the recognition result is successful (represented as "N" path in FIG. 4).

FIG. 5 is a flowchart of an image processing method 500 in accordance with some embodiments of the present disclosure. The image processing method 500 is suitable for an image processing system including an image sensor, an object detector, an AI inference engine and a mode controller shown in FIG. 1 (such as image processing system 100 shown in FIG. 1) or other similar systems. As shown in FIG. 5, the image processing method 500 includes steps S510 to S550. The following paragraphs describe the implementation method of each step in conjunction with FIGS. 1-5.

Step S510: capture an image by utilizing the image sensor. The description of Step S510 may refer to the operation of each component in the image processing system 100 shown in FIG. 1, for example, and will not be described again here.

Step S520: bin the image in a binning mode. The description of Step S520 may refer to the operation of each component in the image processing system 100 shown in FIG. 1, for example, and will not be described again here.

Step S530: utilize the object detector to determine whether an object exists in the image and utilize a bounding box to frame the object to obtain an ROI image after determining that the object exists in the image. The description of Step S530 may refer to the operation of each component in the image processing system 100 shown in FIG. 1, for example, and will not be described again here.

Step S540: utilize the AI inference engine to recognize the ROI image to obtain a recognition result. The description of Step S540 may refer to the operation of each component in the image processing system 100 shown in FIG. 1, for example, and will not be described again here.

Step S550: utilize the mode controller to compare an ROI size of ROI image with a lower limit of an ROI size threshold. The description of Step S550 may refer to the operation of each component in the image processing system 100 shown in FIG. 1, for example, and will not be described again here.

As can be seen from the above description, the image processing system and image processing method determines to crop the image or perform the binning on the image based on the ROI size of the ROI image and the recognition result of the object, the purpose is to increase the distance at which objects can be recognized by the AI inference engine at low cost, that is, increase the recognition rate of the object in the image without additional sensing components, such as optical zoom components.

It will be apparent to those skilled in the art that various modifications and variations can be made to the structure of the present disclosure without departing from the scope or spirit of this disclosure. In view of the foregoing, it is intended that the present disclosure cover modifications and variations of this disclosure provided they fall within the scope of the following claims.

What is claimed is:

1. An image processing system, comprising:
an image sensor configured to capture an image;
an object detector configured to determine whether an object exists in the image, and utilize a bounding box to frame the object to obtain a region of interest (ROI) image after determining that the object exists in the image;
an artificial intelligence (AI) inference engine configured to recognize the ROI image to obtain a recognition result; and
a mode controller coupled to the image sensor, the object detector and the AI inference engine, the mode controller configured to compare an ROI size of the ROI image with a lower limit of a ROI size threshold,
wherein the mode controller switches the image processing system to a crop mode and controls the image sensor to capture a crop image according to an ROI location of the ROI image in response to the ROI size being less than the lower limit of the ROI size threshold, and
wherein the mode controller switches the image processing system to a binning mode and controls the image sensor to perform a binning on the image in response to the ROI size being greater than or equal to the lower limit of the ROI size threshold.

2. The image processing system of claim 1, wherein the mode controller is further configured to confirm the recognition result while comparing the ROI size with the lower limit of the ROI size threshold, and
wherein the mode controller switches the image processing system to the crop mode and controls the image sensor to capture the crop image according to an ROI location in response to the ROI size being less than the lower limit of the ROI size threshold and the recognition result indicates that the AI inference engine fails to recognize the ROI image.

3. The image processing system of claim 1, wherein the mode controller is further configured to confirm the recognition result while comparing the ROI size with the lower limit of the ROI size threshold, and
wherein the mode controller switches the image processing system to the binning mode and controls the image sensor to perform the binning on the image in response to the ROI size being greater than or equal to the lower limit of the ROI size threshold and the recognition result is successful.

4. The image processing system of claim 1, wherein the binning mode is a default mode of the image processing system.

5. The image processing system of claim 1, wherein the ROI location is determined by a location of the bounding box.

6. The image processing system of claim 1, wherein the ROI location is composed of two or more ROI coordinates.

7. The image processing system of claim 6, wherein the mode controller controls the image sensor to capture the crop image according to the ROI coordinates.

8. The image processing system of claim 1, wherein a size of the crop image is predetermined and smaller than a size of the image.

9. The image processing system of claim 1, wherein the mode controller controls the image processing system to stay in the crop mode and controls the image sensor to capture the crop image according to the ROI location in response to the ROI size being greater than or equal to the lower limit of the ROI size threshold.

10. The image processing system of claim 1, wherein the mode controller switches the image processing system to the binning mode and controls the image sensor to perform the binning on the image in response to the ROI size being greater than an upper limit of the ROI size threshold.

11. An image processing method suitable for an image processing system comprising an image sensor, an object detector, an AI inference engine and a mode controller, the image processing method comprising:

capturing an image by utilizing the image sensor;
  binning the image in a binning mode;
  utilizing the object detector to determine whether an object exists in the image and utilizing a bounding box to frame the object to obtain an ROI image after determining that the object exists in the image;
  utilizing the AI inference engine to recognize the ROI image to obtain a recognition result; and
  utilizing the mode controller to compare an ROI size of the ROI image with a lower limit of an ROI size threshold,
  wherein the mode controller switches the image processing system to a crop mode and controls the image sensor to capture a crop image according to an ROI location of the ROI image in response to the ROI size being less than the lower limit of the ROI size threshold, and
  wherein the mode controller switches the image processing system to the binning mode and controls the image sensor to perform a binning on the image in response to the ROI size being greater than or equal to the lower limit of the ROI size threshold.

12. The image processing method of claim 11, wherein the mode controller is further configured to confirm the recognition result while comparing the ROI size with the lower limit of the ROI size threshold, and wherein the mode controller switches the image processing system to the crop mode and controls the image sensor to capture the crop image according to an ROI location in response to the ROI size being less than the lower limit of the ROI size threshold and the recognition result indicates that the AI inference engine fails to recognize the ROI image.

13. The image processing method of claim 11, wherein the mode controller is further configured to confirm the recognition result while comparing the ROI size with the lower limit of the ROI size threshold, and wherein the mode controller switches the image processing system to the binning mode and controls the image sensor to perform the binning on the image in response to the ROI size being greater than or equal to the lower limit of the ROI size threshold and the recognition result is successful.

14. The image processing method of claim 11, wherein the binning mode is a default mode of the image processing system.

15. The image processing method of claim 11, wherein the ROI location is determined by a location of the bounding box.

16. The image processing method of claim 11, wherein the ROI location is composed of two or more ROI coordinates.

17. The image processing method of claim 16, wherein the mode controller controls the image sensor to capture the crop image according to the ROI coordinates.

18. The image processing method of claim 11, wherein a size of the crop image is predetermined and smaller than a size of the image.

19. The image processing method of claim 11, wherein the mode controller controls the image processing system to stay in the crop mode and controls the image sensor to capture the crop image according to the ROI location in response to the ROI size being greater than or equal to the lower limit of the ROI size threshold.

20. The image processing method of claim 11, wherein the mode controller switches the image processing system to the binning mode and controls the image sensor to perform the binning on the image in response to the ROI size being greater than an upper limit of the ROI size threshold.

* * * * *